April 21, 1925.
W. W. MacDONALD
1,534,984
SELF CLOSING VALVE
Filed March 17, 1924
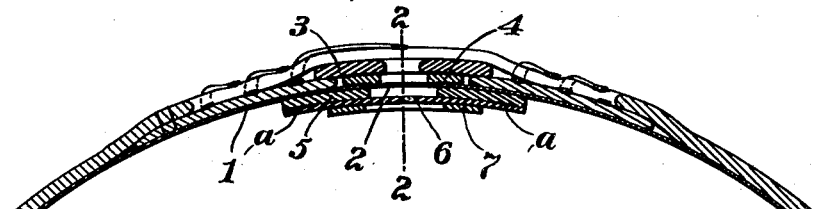
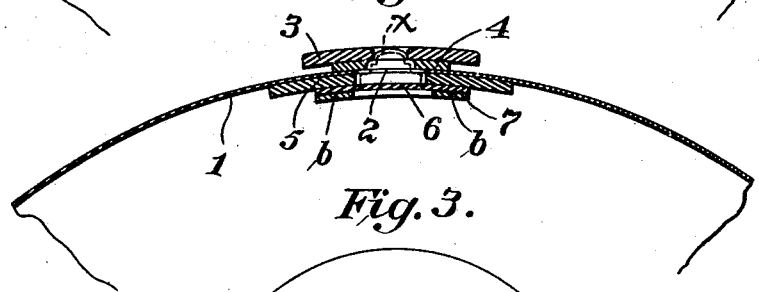
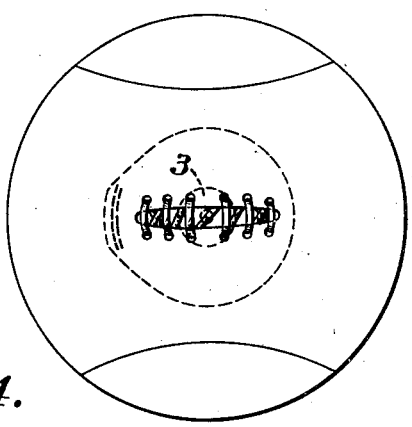
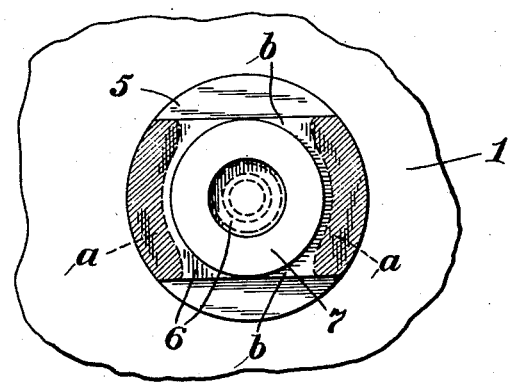
*Inventor:*
William W. MacDonald,
by *Spear, Middleton, Donaldson & Hall*
Attys.

Patented Apr. 21, 1925.

1,534,984

UNITED STATES PATENT OFFICE.

WILLIAM W. MacDONALD, OF CHICOPEE, MASSACHUSETTS, ASSIGNOR TO A. G. SPALDING & BROS., OF NEW YORK, N. Y., A CORPORATION OF NEW JERSEY.

SELF-CLOSING VALVE.

Application filed March 17, 1924. Serial No. 699,820.

*To all whom it may concern:*

Be it known that I, WILLIAM W. MAC-DONALD, a citizen of the United States, and resident of Chicopee, in the county of Hampden and State of Massachusetts, have invented certain new and useful Improvements in Self-Closing Valves, of which the following is a specification.

The invention concerns means by which the bladder of a foot ball or air containing member may be inflated and the air maintained therein, an object of the invention being to overcome objections existing to the ordinary filling tube which requires to be doubled up and tucked within the cover after the ball is inflated and before the lacing can be done.

The invention consists in the features and combination and arrangement of parts hereinafter described and particularly pointed out in the claims.

In the accompanying drawings—

Figure 1 is a sectional view of the invention, only a portion of bladder and the cover being shown, the automatically closing valve being shown in the position assumed by it when the bladder is deflated.

Fig. 2 is a similar sectional view, but taken in a plane at right angles to the plane of the section of Fig. 1 and with the closed position of the valve indicated in dotted lines. Fig. 3 is a view of the complete ball laced up.

Fig. 4 is a detail view of the valve looking at the inner side of the bladder.

Fig. 5 is a view of the filling tube used for inflating the bag.

In these drawings 1 indicates a portion of the wall of the bladder or inflatable member. This has an opening 2. There are a number of washers adjacent this opening. The washers 3 and 4 lie on the outer side of the bladder wall, the washer 4 being in the form of a ring having an opening preferably smaller in diameter than that of the opening 2, so that the inner edge of this ring overhangs said opening 2. The outer washer 3 is of considerably larger diameter than the washer 4 and its opening is smaller in diameter than the opening of the washer 4, so that its inner edge overhangs opening of washer 4.

The outer washer 3 also overhangs the washer 4 at the outer edge of the latter and this construction provides a neck, i. e. the washer 4, which passes through the opening in the closing flap of the cover member of the ball with the washer 3 lying on the outer side of said flap.

On the inner side of the bladder and surrounding the opening therein is a washer 5 of ring form, the opening in which is substantially of the same diameter as the opening 2. This washer is of greater diameter than the other washers and it has attached to its inner side at opposite points the valve member 6, and on the inner side of this is the ring washer 7. The valve member is longer than wide, as will be seen by a comparison of Figures 1 and 2, the planes of section of which are at right angles to each other. All the washers together with the bladder and the valve member are made of rubber and these are attached to each other by cement or vulcanization in the usual manner well known to those skilled in the art. The comparatively heavy black lines between the parts indicate the places where the members are attached to each other by vulcanization or cement, and from this it will be noticed that the valve member is attached or vulcanized to the inner side of the washer 5, only at the ends *a* of said valve member. Its side portions *b* are not attached to the washer 5 and thus by introducing a tube through the openings in the washers 3 and 4, and blowing through this tube, the valve member 6, being extensible or elastic, will be forced inwardly and its side portions *b* will leave their seating on the washer 5 so that the air may enter the bladder to inflate the same.

The filling tube may be used to push the valve member inwardly.

A form of tube is shown in Fig. 5 having a lip 8 to underlie the overhanging edge of the outer washer 4. When the bladder has been inflated and the filling tube withdrawn, the valve member being of rubber will, by reason of the air pressure within the bladder, distend as indicated in dotted lines *x* in Fig. 2 and will seat itself against the edges of the washers 3, 4, and 5 and effectually close the openings thereof against the escape of the air from within the bladder.

The whole device lies within the bounds of the outer cover. The washer 3 may be doubled up for insertion through the opening of the leather flap with which the cover is provided. As there is no permanently attached tube to be bent over, tied and tucked within the cover after the ball is inflated, the lacing of the ball may be done while the ball is deflated or partly inflated, thus avoiding the trouble and inconvenience of lacing the ball after inflation. The filling tube can be inserted between the strands of the lacing after the cover has been laced. I utilize the plurality of washers to build up the structure in an inexpensive and convenient way, but it will be understood that the disclosure herein made is illustrative of the features involved in the invention, and are not set forth as restrictive upon the scope of the invention this being defined by the appended claims.

It will be observed that with the structure disclosed there is provided a seat for the extensible valve member of a stepped formation, because the openings through the several washers 5, 4, and 3 are graduated as to their relative diameters, the largest diameter being innermost, and the smallest diameter being outermost. The extensible valve will budge into the corner spaces of these steps and thus insure a tight seal, and a blow or kick delivered directly at the region of this valve will not cause leakage, but will result in the valve member seating itself more tightly around the corners of the washers and into the spaces of the stepped formation.

In Figure 4 the diagonal shading indicates the area of attached surfaces between the members 5 and 6.

I claim:

1. In combination with a foot ball bladder, an elastic or distensible valve member, extending across the opening therein, and a seat washer having an opening and spaced apart from said valve member, said valve member under pressure of the air within the bag distending and bearing against the inner edge of said washer, substantially as described.

2. In combination with a foot ball bladder, an elastic or distensible valve member lying within the said bladder and across the opening therein, and a seat for said valve spaced apart therefrom and with which the valve member contacts when the valve member is distended from its normal plane by the air pressure within the bag.

3. In combination with a foot ball bladder having an opening, a washer on the outer side of the bag overhanging the said opening, and a valve member consisting of a sheet of rubber attached to the inner side of the bladder across said opening, said valve member being distensible and seating itself against the overhanging edge of the washer when the bladder is inflated, substantially as described.

4. In combination with a foot ball having a flap at its laced opening, a bladder having an opening for inflation, a distensible valve member of rubber extending across said opening and attached to the bladder, a washer of rubber on the outer side of the bladder having a reduced neck portion, said neck and washer being adapted to pass through the opening in the flap with the washer lying on the outer side of said flap, said valve member distending by the internal air pressure and seating on a portion of the outer washer or neck which is spaced apart from the valve member when in normal position.

5. In combination with a foot ball or air containing member having a bladder and a cover provided with an opening and a flap at said opening, a valve consisting of a sheet of elastic material extending across the opening in the bladder and controlling the said opening, and a washer overlying the flap and having a portion extending through the opening thereof and attached to the bladder, said washer being flexible, substantially as described.

6. In combination with a foot ball bladder or air containing member having an opening, a washer secured on the outer side of the bladder, a larger washer secured to the one first mentioned, a washer secured to the inner side of the bladder, a sheet of elastic material secured to the said inner washer at opposite points, and free from attachment at other points, a washer secured to the inner side of said sheet material, said sheet forming a valve which under pressure of the air within the bladder will distend into the opening of the bladder and the washers lying on the outer side of said sheet, substantially as described.

7. In combination with a foot ball bladder or air containing member having an opening, an elastic and flexible rubber washer on the outer side of said bladder at said opening, and an elastic sheet rubber valve member on the inner side of the bladder distensible under pressure of the internal air into the said opening, substantially as described.

8. In combination with a football bladder or the like, a valve seat carried thereby and of stepped formation surrounding the filling opening and an elastic sheet rubber valve adapted under the internal pressure to conform substantially to said seat which by reason of its stepped formation is of general outwardly tapered shape, substantially as described.

9. A bladder for foot balls having an opening with a valve seat surrounding the same and of general outward tapered form, and an elastic sheet valve extending across the inner side of said opening and expansible into said tapered seat under internal pressure, substantially as described.

In testimony whereof, I affix my signature.

WM. W. MacDONALD.